United States Patent [19]
Maul et al.

[11] Patent Number: 5,652,573
[45] Date of Patent: Jul. 29, 1997

[54] APPARATUS FOR THE ACQUISITION OF EVENTS, IN PARTICULAR IN CARRIER PIGEON RACING

[75] Inventors: Ludwig Maul, Sulzbach-Rosenberg; Klaus Geisslinger, Leinburg; Bolko Wietrzynski, Lauf, all of Germany

[73] Assignee: Diehl GmbH & Co., Nürnberg, Germany

[21] Appl. No.: 284,908

[22] Filed: Aug. 2, 1994

[30]     Foreign Application Priority Data

Dec. 22, 1993 [DE] Germany .............................. 9319760 U
Apr. 13, 1994 [DE] Germany ........................... 44 12 620.4

[51] Int. Cl.[6] .............................................. G08C 19/00
[52] U.S. Cl. ......................... 340/825.54; 340/825.69; 340/825.72; 340/825.44
[58] Field of Search ............................... 340/565, 870.28, 340/825.54, 870.01, 825.69, 825.72, 825.44

[56]               References Cited

U.S. PATENT DOCUMENTS

| | | | |
|---|---|---|---|
| 4,730,188 | 3/1988 | Milheiser | 340/825.69 |
| 4,823,367 | 4/1989 | Kreutzfeld | 340/565 |
| 5,194,861 | 3/1993 | St. Clair | 340/870.25 |
| 5,446,265 | 8/1995 | McAllister | 340/825.54 |

FOREIGN PATENT DOCUMENTS

9305746 U   1/1994   Germany .

*Primary Examiner*—Jeffery Hofsass
*Assistant Examiner*—Albert K. Wong
*Attorney, Agent, or Firm*—Scully, Scott, Murphy & Presser

[57]                 ABSTRACT

An apparatus for the acquisition of items of identity information (19/31), in particular for the measurement of sport time and/or for monitoring and possibly invoicing in the course of access checks or operations involving transportation of material, is to be designed to be as manipulation-resistant as possible. For that purpose a distinction is made between local acquisition regions, in each of which is installed at least one reading device (22), and at least one central processing region which is operated separately therefrom and under special control and at which an evaluation device (43) is operated. The transfer of data between the acquisition region and the processing region is effected so-to-speak 'physically' by means of an operating device (30) which can only be connected either to the reading device (22) or to the evaluation device (43). The items of identity information (19) which are received in encoded form by way of the reading device (22) and which are called up therefrom in encoded form again by the operating device (30) are linked at the time of their reception with an item of real-time information (27) from an autonomous internal clock circuit (28). The latter is checked at certain intervals by means of a radio controlled clock with reference to the statutory time and if necessary corrected. If the correction value exceeds a certain magnitude, then that is additionally protocoled because the cause of the time correction may be an operational defect in the clock circuit (28) or an external manipulation of the radio telegram received by the time receiver (29).

14 Claims, 1 Drawing Sheet

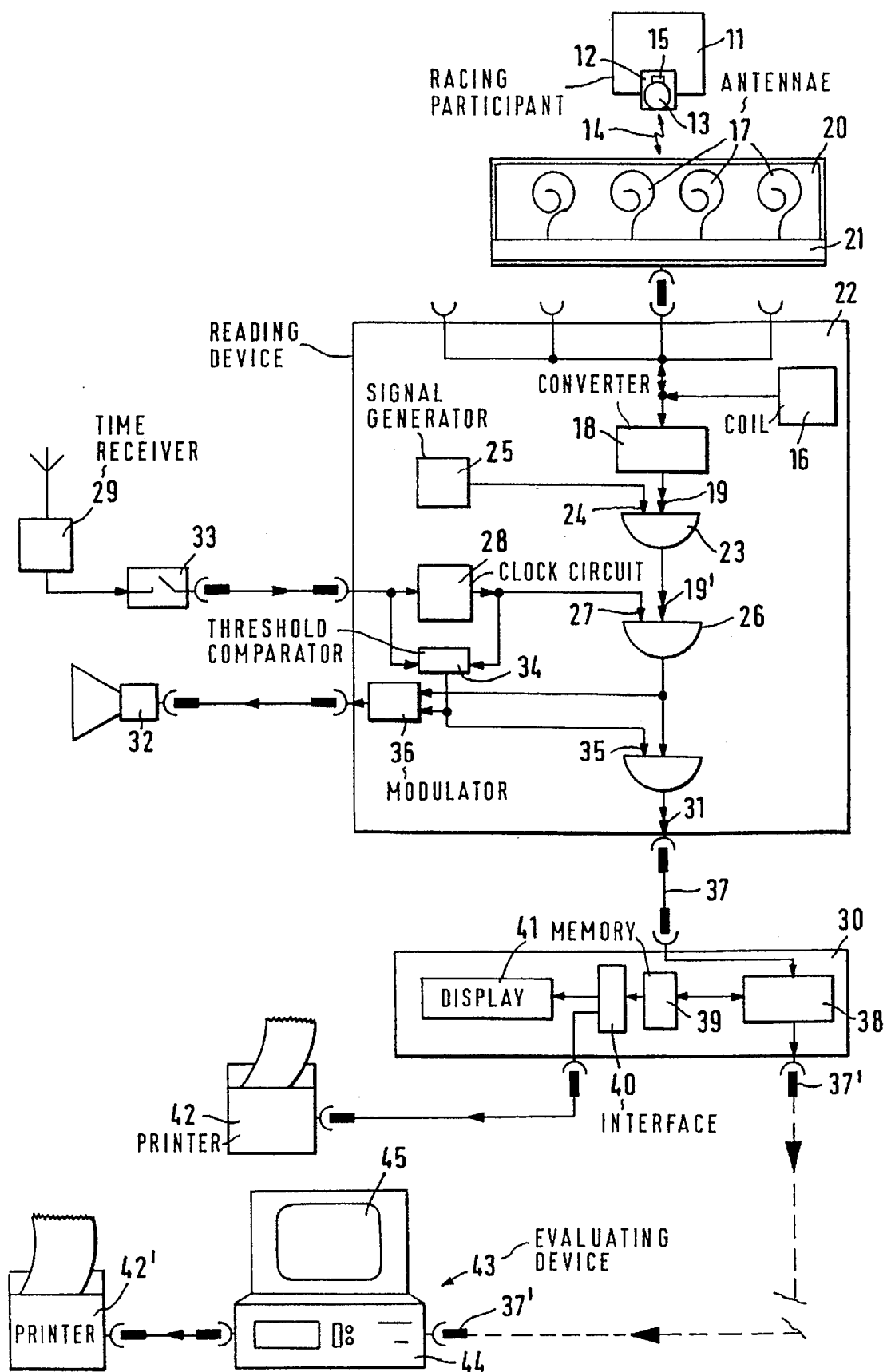

APPARATUS FOR THE ACQUISITION OF EVENTS, IN PARTICULAR IN CARRIER PIGEON RACING

BACKGROUND OF THE INVENTION

1. Field of the Invention

The invention concerns an apparatus for the manipulation-resistant acquisition of events, in particular items of information in carrier pigeon racing, with contactless reading-out of the identification carriers of participants and imtermediate storage of the items of identity information thereof.

2. Description of the Prior Art

Such an apparatus is described in greater detail in prior German Utility Model No G 93 05 746, in regard also to the use which is preferentially considered, in relation to carrier pigeon racing. In addition however such apparatuses can also be advantageously used in the framework of access control and material economy, for example in order to be able to detect or record the transportation of material in regard to individual products in the course of manufacture or in the course of delivery of goods, and in order also to be able to reconstruct that aspect at a later date.

When the situation involves clearly allocating given sets of data to individual living or dead objects, it is then not enough clearly to identify those objects (people or articles) themselves (for example by a given number circle or plate). For, due to transmission errors but also as a result of attempts at manipulation, even going as far as sabotage, the identifications or supplementary items of information which are to be specifically associated therewith can be falsified; in that respect, one fore of falsification can also provide that, by virtue of subsequent manipulation operations in the data bank, the stored data sequence is changed relative to the data sequence which actually occurred. If such errors and attempts at intervention cannot be at least subsequentlyrecognised clearly as such, then the apparatus of the general kind set forth: is not forgery-resistant to the required extent and is thus not suitable for many purposes of use; in particular when an important consideration is also a subsequent documentation option and further processing of the data base, such as for example in sport, but also in relation to access monitoring in regard to safety procedures, or for example in regard to garbage disposal which is in accordance with statutory provisions.

Therefore the technical object of the present invention is so to design an apparatus of the general kind set forth that alterations in the data bank can be recognised as such in order for example to be able to exclude the corresponding items of data from the regular further treatment operation.

In accordance with the invention that object is essentially attained in that the apparatus of the general kind set forth also has the feature in that there is provided an operating device as a transportable intermediate storage means.

SUMMARY OF THE INVENTION

In accordance with that construction, a distinction is made between a detection or acquisition region, an intermediate storage region and a processing region, in regard to apparatus and space and also in organisational terms. The acquisition region includes a reading device with its antennae for the contact-less interrogation of identification carriers. In that respect, by means of an electrical identification, the antennae or reading devices for registration for example of the participants entered in a competition at a central entry location are distinguished from those which detect the arrival of a participant at the finish (for example at the home loft or cote of a carrier pigeon). In that way it is possible subsequently to ensure that only previously announced ('entered') participants are also considered in terms of assessment as a winner. Any item of identity information which is supplied by the antenna is linked in the reading device with an item of safeguard information, and thereafter that combination can no longer be altered. The safeguard information can be taken from continuous background information or can be derived from a pseudo-random interrelationship or can simply represent a numerical sequence; preferably it includes an item of sequence information in the form of the current moment in time upon acquisition. Accordingly the subsequent addition of a further identification number would therefore be unavoidably recognisable by virtue of the fact that the interrelationship in terms of development of the safeguard information is broken down, for example because the extent of the data set used, which extent had been closed off, has been enlarged, or because the added data set lies outside the unitary entry time block. The continuous time information is supplied by an installed quartz clock. So that all times which are linked to items of identity information can be absolutely compared to each other, from time to time there is synchronisation of the quartz clock with the (statutory) time as can be recorded and decoded by way of the longwave receiver of a radio controlled clock. If synchronisation results in a noticeable correction in respect of the time of the quartz clock (for example of the order of magnitude of at least one second), then that is protocoled separately, because a defect or manipulation has possibly occurred at the quartz clock. During the finish of the competition, the radio controlled clock is desirably switched off so that only the continuously elapsing quartz time is associated with detection of the finish of the competitors of the competition; in addition that ensures that external manipulation of the clock cannot possibly occur by way of an interference transmitter during the finish of the competition. The reading device with its antennae can be set up or fixedly installed for continuous or intermittent use at the acquisition location, and it generally remains there, for example therefore at the entry location or at the pigeon loft or cote or other finishing point.

Provided for intermediate storage is a transportable device which is referred to as here as the operating device and which serves to receive and possibly present the items of identity information which are supplied by the reading device and which are therefore aleady supplemented; however only storage of the items of information in their received sequence, and not yet further processing. For the latter, the operating device which is designed to be easy to manage and which is therefore easily transportable must be brought to a centrally operated and separately monitored evaluation device into which the stored data sequence is read out for further processing (for example for producing lists of prizes or garbage collection invoices).

As no feed into the operating device is provided, except from the reading device, and as no output of the sets of data which have been put into intermediate storage thereon is provided, except directly into the authorised evaluation device, that ensures that the acquired data sets can admittedly be examined for the sake of information at the operating device and can also be completely or partially printed out for documentation purposes, but they cannot involve any alteration whatsoever and are therefore later transferred in the original condition as received, directly to the authorised evaluation device.

In order to safeguard against any manipulations, the items of identity information are transmitted from the detected objects in encoded form to the reading device and from there again transmitted in encoded form to the operating device. The one encoding operation is predetermined by the reading device by a code which is currently produced there so that no knowledge about the content of the instantaneous data transmission can be obtained and no external data can be effectively fed in, by any tapping in on the connecting line. In the sate way the operating device generates a current encoding code when recalling the data from the reading device. Furthermore the data, in addition to the real-time linking in the reading device, may also be subjected to background modulation which can also reveal any subsequent changes in the data sequence. Noticeable deviations in respect of the time information from the internal clock circuit in comparison with the statutory time supplied by the radio controlled clock are detected separately and additionally documented (for example in the data set in question) so that it is also not possible for the internal clock to be changed in an inconspicuous manner and for the time base thus to be shifted in comparison with other real-time data acquisition systems.

BRIEF DESCRIPTION OF THE DRAWINGS

Additional alternatives and developments as well as further features and advantages of the invention will be apparent from the further claims and, having regard also to the information in the Abstract, from the following description of a preferred embodiment of the construction according to the invention, which is sketched in highly abstracted form in the drawing, in the form of a single-pole block circuit diagram, which is restricted to what is essential. The single FIGURE in the drawing shows an operating device which for receiving items of information can be connected either to a reading device or instead to an evaluation device for processing of the items of information received.

DETAILED DESCRIPTION OF THE PREFERRED EMBODIMENTS

Each object 11 to be detected, for example an individual living being as a participant in a competition or an individual item in the course of passing predetermined locations, is provided with an identification carrier 12 which individually identifies it. The carrier 12 has a coil 13 in which a voltage is induced by means of an inductive high-frequency field 14 for operation of a circuit 15 for reading out a stored binary pattern. The coil 13 is damped in that rhythm. A fluctuation in amplitude results therefrom in the same rhythm, in the magnetic antenna 17 which is fed by a high-frequency source 16. The fluctuation in amplitude is converted by a converter 18 into an item of digital identity information 19.

So that a plurality of objects 11 can be virtually simultaneously detected, a plurality of antennae 17 are combined together in regard to apparatus structure to provide an acquisition device 20. Routing devices between the individual antennae 17 provide that each antenna 17 can simultaneously detect at most one object identification carrier 12 so that there is no superimposition in respect of time of different items of identity information 19 at an antenna 17. A change-over switch 21 serves for multiplex interrogation of the antennae 17. A plurality of such acquisition devices 20 can be connected to a reading device 22. The input memory of the converter 18 then receives in parallel mode for example items of information which occur in time-overlapping relationship, from different acquisition devices 20, prior to the serial output for the purposes of intermediate storage.

Each object 11 is clearly identified by the item of identity information stored in its reading circuit 15, in the form for example of a number and/or a letter cede. If that code is not used directly as binary information for damping the coil 13, but is previously encoded with a random code, that ensures that the identity information 19 to be recorded by the reading device 22 cannot be faked by anyone damping the magnetic antenna field 14 with a given item of information; for, for effective manipulation, the current encoding code would also have to be known, and without that code, decoding the item of identity information is no longer possible at a later time.

Current access of an item of new real-time identity information 31 (by virtue of instantaneous detection of an object 11 by means of one of the antennae 17) can be signalled for operational monitoring by an optical and/or acoustic signal generator 32.

Each item of identity information 19 which is transmitted by the antenna 17 in encoded form to the reading device is supplemented therein by an item of real-time information 27, by means of a combination circuit 26. The information 27 is supplied by an autonomously operating and preferably quartz-stabilised internal clock circuit 28. A long-term variation relative to the actual time, which is never entirely to be excluded in autonomous clocks, is checked at long intervals and possibly corrected by means of a time receiver 29. The time receiver 29 virtually continuously receives the telegrams in respect of the statutory time, which are transmitted for example by way of a longwave transmitter, demodulates them, and in accordance therewith possibly corrects any deviating current time information in the clock circuit 28. That ensures that the real-time-safeguarded identity information 31 which is then again outputted in encoded form to an operating device 30 by the reading device 22 always involves a link between the currently detected identity information 19 and the currently correct time information 27.

Particularly in the case of a battery-powered system, the time receiver 29 will not have to be kept constantly in operation, because of the high level of constancy of the clock circuit 28 which is operated in a stabilised mode. It is sufficient for the time receiver 29 to be set in operation from time to time—for example once per day—or for it to be connected to the reading device 22 from time to time, and that is indicated in the drawing by means of a switch 33. If a summertime-wintertime change has not just taken place in the pause or break in reception, and if the clock circuit 28 is operating properly, then the time differences thereof, which have to be corrected, are at most of the order of magnitude of fractions of a second, which is of no significance in regard to evaluating the realtime identity information 31. If however a greater need for correction is found to exist when the time receiver 29 is temporarily switched on, for example due to a disturbance in the function of the autarchic clock circuit 28, then a comparison threshold means 34 responds in order to supplement the (corrected) real-time identity information 31, by an item of reference information 35. The latter may simply be a mark which, in subsequent data evaluation, triggers off a warning in regard to the dependability of the current information; or the system specifies the actual numerical value by which the time information 27 supplied by the clock circuit 28 was corrected by the time receiver 29. If the time comparison threshold means 34 is additionally designed to transmit with the item of reference information 35 the news that, when the time receiver 29 was switched on, no correction (or at any event no correction worth mentioning) in respect of the time information 27 from the clock circuit 28 was required, then, just by virtue of that addition, it is possible later to establish, from the sequence of real-time identity information 31 stored in the operating device 30, which items of identity information 19 were at any event correctly acquired in respect of time, and in which acquisition period incorrect information can have occurred as a result of interference phenomena.

Incorrect times can be caused in particular by a saboteur with an interference transmitter directing a wrongly or falsely encoded time program into a receiver 29, whereby the free-running internal clock circuit 28 is at any event temporarily set wrong. Such an act of sabotage would however be clearly apparent later because of the time jump which occurs upon automatic adjustment of the internal quartz clock, for example from an item of additional information (reference information 35), in the sequence of the stored items of real-time identity information 31. It can additionally be provided that the signal generator 32 is actuated by way of a modulator 36 from the time comparison threshold means 34, so that for example rising and falling tones draw the attention of the operator of the system to the fact that an extraordinary deviation in the time information 27 has very recently occurred so that the operator can immediately check the system and possibly arrest the person producing the external intervention. However such external manipulations of the time information 27 in the identity protocol can in practice be prevented in a simple manner by a procedure whereby the time receiver 29 is switched on temporarily a certain period of time before the commencement of the transfer of a series of items of identity information 19, whereupon, during data acquisition, the clock circuit 28 which is reliably set to the current time then continues to operate entarchically without the possibility of external influence. After termination of data acquisition, for example in the evening of a day of competition, the time receiver 29 is switched on again for checking purposes. The item of reference information 35 which then possibly occurs is linked to a special item of information which is also introduced for checking purposes so that at the end of the protocol which is stored in the operating device 30, regarding the items of indentity information which were received in succession, there is a clear indication as to whether the recorded items of time information 27 passed through continuously, without jumps.

In the reading device 22 the received items of identity information 19, in addition to the real-time association, can be underlaid with a continuous background information 24 from a signal generator 25. If, later, items of identity information 19' modified in that way should be manipulated by erasure or interchange, then the background information 24 would no longer be continuously contained in the remaining sequence of the items of identity information 19', but would have gaps or jumps. That can be easily detected upon evaluation of the items of information 19', in order in that respect to block the evaluation operation or at least to provide it with markings by which the results can be viewed in relative terms in regard to their validity because of possible manipulation interventions.

The items of information which are acquired in the reading device 22, processed and combined are transmitted to the operating device 30 again in the form of items of safeguarded identity information 31, now encoded from the operating device 30, for example by way of plug cables 27, and in the operating device 30 the items of information 31 are deposited by way of a switching or routing means 38 in the sequence of their input, in a non-volatile memory 39. By way of a manually operable interface 40, the entire content of the memory 39 or a part selected from the sequence of the stored items of real-time information 31 can be called up for optical presentation on a display 41 and/or for protocoling on an externally connectable printer 42. In that respect however it is not the complete items of identity information of the identity carriers that are outputted, but only details which are derived therefrom and which are admittedly sufficient for object identification but not sufficient for imitation of the complete information. In addition object association with a higher classification can be indicated (for example in relation to the pigeon association ring number), if same was additionally stored upon object entry. The encoded direct transmission from the reading device 22 to the operating device 30, for example by way of a short plug cable 37, and the security measures in the form of the continuous time and possibly background information 27, 24—and possibly in addition a reference information 35 relating to irregular time jumps—ensures that at any event no concealed manipulations are contained in the content of the memory 39. In addition, in regard to each data set, documentation is effected as to the antenna 17 or the reading device 22 by way of which it was obtained. It is thus possible to check that a closed set, which is closely graded in respect of time, of items of identity information 19 was recorded with an entry location antenna 17, whereas a finish antenna 17 supplied the smae items of identity information 19 in another sequence, displaced in respect of date and/or clock time and distributed in respect of time over a greater period.

Also for reasons of safeguarding against manipulation, the system provides that the operating device 30 exclusively stores in unchanged form the sequences, which are read in by way of the antennae 17, of items of identity information 19 (as described above, supplemented to give safeguarded items of information 31), without however providing for further processing. On the contrary, provided for that purpose is a central evaluation device 43 having a computer 44 in which especially tested and admitted programs for the data preparation operation which is specifically involved are run, for example for determining the order of competitors in a competition, not only having regard to the finishing time of the individual competitors (personified objects 11), but also for example having regard to special bonus or handicap times for compensation in respect of performance of individual competitor identity numbers which are entered for that competition (items of information 19). Therefore, it is only in the central evaluation device 43—which is operated for example on the premises of a carrier pigeon racing organisation—that the list of winners, results of the competition and prize tables are drawn up from the items of identity information 31 stored in various operating devices 30 in real-time association, and for example displayed on a picture screen 45 or permanently documented by means of a printer 42.

Also in order to ensure that transmission errors or even manipulation are prevented, the individual operating devices which are to be read into the central evaluation device 43 by way of their switching or routing means 38 are not coupled together for example by way of modems and telephone lines; but each operating device 30 which is used for the intermediate storage of data must be separated from the reading device 22 and then physically taken to the associated evaluation device 43 where the content of its memory 39 is called up for further processing (for example by means of another plug cable 37'). In that case, the current times (according to date and clock time) of the internal clock circuits 28 of the operating devices 30 which are brought for evaluation are also compared together in order to be able to document any noticeable deviations in one of the devices.

In addition, in the course of data transfer to the evaluation device 43 or later, a check is made therein to ascertain that only previously entered identity numbers were later also detected or acquired at the input, that is to say, no individuals which for example were not at all entered for the competition are subjected to the evaluation operation. Such deviations may occur only if the competition committee substituted the identification carrier 12 of an object 11 which was picked out as a random sample, after its entry, for checking purposes (and documented same as evidence): that originally entered item of identity information 31 naturally should not occur again at the subsequent finish.

With the data transfer at the same time identification or erasure of the data in the memory 39 can be effected or at least prepared for, in order to ensure that the items of real-time identity information 31, once read into the central evaluation device 43 from a given operating device 30, cannot be fed in again here or otherwise a second time.

We claim:

1. A System for the manipulation-resistant acquisition of identity information items (19) obtained in carrier pigeon racing, including means for the contactless remote reading-out of identification carriers located on the racing participants; including an intermediate memory storage for inductively receiving the identity information, said memory storage comprising a transportable interim memory storage (39) either connected to reading means (22) for the encoded receipt of the identity information (19) including arrival real-time information (27) for the operation of at least one interrogating antenna (17) or for transporting the items of information to evaluating means (43).

2. Apparatus as claimed in claim 1, wherein said reading means is operatively connected to at least one said antenna for transmitting participant-specific identity information, and means for linking said identity information in the reading means with items of safeguarding information prior to transfer of said identity information to the interim memory storage.

3. Apparatus as claimed in claim 2, wherein there are provided different kinds of said antennae and reading means so as to enable recognition of distinguished safeguarded identity information regarding the kind of antenna or reading means with which the corresponding identity information was acquired.

4. Apparatus as claimed in claim 3, wherein the safeguarded identity information facilitates an associated identity information to represent either start information or final information.

5. Apparatus as claimed in claim 2, wherein the identity information received by the at least one antenna is linked in the reading means with real-time information.

6. Apparatus as claimed in claim 5, wherein the real-time information is derived from an internal clock circuit which is intermittently synchronized with a current absolute statutory time through a receiver of a radio-controlled clock.

7. Apparatus as claimed in claim 6, wherein a time correction which exceeds a predetermined minimum amount is separately protocolable upon synchronization of the internal clock circuit.

8. Apparatus as claimed in claim 2, wherein the safeguarded identity information is contained in the interim memory storage in the received and stored sequence of said information.

9. Apparatus as claimed in claim 2, wherein the transmissions of information from the at least one antennae to the reading means and from the reading means to the interim memory storage are transmitted through cables.

10. Apparatus as claimed in claim 2, wherein the information transfers to the reading means from the at least one antennae and to the interim memory storage from the reading means are controlled and currently encoded from respectively the reading means and the interim memory storage.

11. Apparatus as claimed in claim 1, wherein the identity information which is contained in the memory storage is associated with a participant number which is allocated in parallel therewith.

12. Apparatus as claimed in claim 2, wherein a plurality of said antennae are combined to form an information acquisition means with antenna change-over switches, and a plurality of acquisition devices are switchable to a parallel-series intermediate said memory storages in the reading means so as to provide for a mutual mechanical compartmentalization of the acquisition region of an individual said antennae of an acquisition means.

13. Apparatus as claimed in claim 1, wherein a signal generator is excitable upon transfer of a respective identity information into selectively the reading means and the memory storage.

14. Apparatus as claimed in claim 6, wherein the real-time receiver is temporarily connected to the internal, autarchically operating clock circuit over predetermined intervals of time preceding a transfer of identity information from the at least one antenna for the purposes of synchronization of said clock circuit, and a correction with regard to the clock circuit which exceeds a predetermined minimum amount of time is then separately protocolled.

* * * * *

UNITED STATES PATENT AND TRADEMARK OFFICE
CERTIFICATE OF CORRECTION

PATENT NO. : 5,652,573

DATED : July 29, 1997

INVENTOR(S) : Ludwig Maul, et al.

It is certified that error appears in the above-identified patent and that said Letters Patent is hereby corrected as shown below:

On the Title page, Section [30], under "Foreign Application Priority Data", line 1:

"9319760 U" should read --93 19760.8--

Column 1, line 14: "Description" should read --Discussion--

Column 1, line 39: "forth:" should read --forth--

Column 3, line 9: "sate" should read --same--

Column 4, line 3: "cede" should read --code--

Column 7, line 20, Claim 1: "System" should read --system--

Signed and Sealed this

Thirteenth Day of October 1998

*Attest:*

*Attesting Officer*

BRUCE LEHMAN

*Commissioner of Patents and Trademarks*